United States Patent
Park

(10) Patent No.: US 10,648,639 B2
(45) Date of Patent: May 12, 2020

(54) DEHUMIDIFYING APPARATUS

(71) Applicant: Yong Kook Park, Gyeonggi-do (KR)

(72) Inventor: Yong Kook Park, Gyeonggi-do (KR)

( * ) Notice: Subject to any disclaimer, the term of this patent is extended or adjusted under 35 U.S.C. 154(b) by 21 days.

(21) Appl. No.: 15/575,859

(22) PCT Filed: May 20, 2016

(86) PCT No.: PCT/KR2016/005394
§ 371 (c)(1),
(2) Date: Nov. 21, 2017

(87) PCT Pub. No.: WO2016/186477
PCT Pub. Date: Nov. 24, 2016

(65) Prior Publication Data
US 2018/0142857 A1 May 24, 2018

(30) Foreign Application Priority Data

May 21, 2015 (KR) .................. 10-2015-0070708
Jul. 7, 2015 (KR) .................. 10-2015-0096256

(51) Int. Cl.
*F21S 45/33* (2018.01)
*F21S 45/30* (2018.01)
(Continued)

(52) U.S. Cl.
CPC ............ *F21S 45/33* (2018.01); *B60Q 1/00* (2013.01); *B60Q 1/04* (2013.01); *F21S 43/10* (2018.01);
(Continued)

(58) Field of Classification Search
CPC .......... F24F 3/14; F24F 3/1405; F24F 3/1411; F24F 3/1417; F24F 1/0083; F21S 45/30; F21S 45/33
See application file for complete search history.

(56) References Cited

U.S. PATENT DOCUMENTS 2,325,657 A * 7/1943 Burkness ............... F24F 3/1411
116/206
3,338,032 A * 8/1967 Siewert .................. F24F 3/1411
96/115
(Continued)

FOREIGN PATENT DOCUMENTS

DE  19756199 A1  6/1998
EP   1818609 A2  8/2007
(Continued)

OTHER PUBLICATIONS

International Search Report dated Sep. 1, 2016, issued in International Application No. PCT/KR2016/005394.

*Primary Examiner* — Nelson J Nieves
(74) *Attorney, Agent, or Firm* — Kilpatrick Townsend & Stockton LLP

(57) ABSTRACT

The present invention relates to a general-purpose dehumidifying apparatus in which a housing having a dehumidifying member therein is applied to an object to be dehumidified (an electric light (such as a street lamp, a vehicle lamp, etc.), an outdoor or indoor electronic enclosure (such as power distributing equipment, communication equipment, security equipment, a solar system, etc.), and the like), and the dehumidifying apparatus removes internal moisture through an outer valve that opens and closes an outer communicating part of the housing (by closing the outer valve) in a case where the temperature of the object to be dehumidified is low and discharges the moisture of the dehumidifying member to the outside by opening the outer valve when the temperature in a lamp module rises in a case where the temperature of the object to be dehumidified is high. The dehumidifying apparatus, according to the present invention, comprises: a housing installed in an object to be dehumidified and having inner and outer communicating parts connected to the outside; a dehumidifying member (Continued)

mounted in the housing; and an outer valve that opens and closes the outer communicating part of the housing.

1 Claim, 6 Drawing Sheets

(51) Int. Cl.
*F21S 43/00* (2018.01)
*B60Q 1/04* (2006.01)
*B60Q 1/00* (2006.01)
*F21S 43/10* (2018.01)
*F21V 33/00* (2006.01)
*F24F 3/14* (2006.01)

(52) U.S. Cl.
CPC .......... *F21S 45/30* (2018.01); *F21V 33/0088* (2013.01); *F24F 3/14* (2013.01)

(56) References Cited

U.S. PATENT DOCUMENTS

| | | | | |
|---|---|---|---|---|
| 4,374,655 A * | 2/1983 | Grodzka | ............... | F24F 3/1411 96/112 |
| 4,809,144 A * | 2/1989 | Suzuki | ............... | F21S 45/33 362/547 |
| 5,230,719 A * | 7/1993 | Berner | ............... | F24F 3/1411 165/4 |
| 5,685,087 A * | 11/1997 | Flaugher | ............... | B60H 1/3229 210/288 |
| 5,980,074 A | 11/1999 | Hwang et al. | | |
| 6,110,261 A * | 8/2000 | Guiragossian | ............... | F24F 3/1411 96/117 |
| 6,422,729 B1 * | 7/2002 | Rohrbach | ............... | F21S 48/335 362/539 |
| 6,883,948 B2 * | 4/2005 | VanDuyn | ............... | F21S 45/33 362/547 |
| 10,184,636 B2 * | 1/2019 | Shin | ............... | F21S 45/33 |
| 2003/0133310 A1 | 7/2003 | VanDuyn et al. | | |
| 2005/0157514 A1 * | 7/2005 | Brinkmann | ............... | F21S 45/33 362/547 |
| 2006/0150817 A1 * | 7/2006 | DeGuiseppi | ............... | B01D 53/261 96/108 |
| 2006/0222791 A1 * | 10/2006 | Hsu | ............... | F24F 3/1411 428/34.4 |
| 2008/0190287 A1 * | 8/2008 | Orava | ............... | B01D 53/0415 95/23 |
| 2010/0216040 A1 * | 8/2010 | Kobayashi | ............... | F24F 3/1411 429/413 |
| 2013/0194818 A1 * | 8/2013 | Gomez | ............... | F21S 45/49 362/547 |
| 2013/0252043 A1 * | 9/2013 | Allison | ............... | H01M 2/1077 429/72 |
| 2014/0318374 A1 * | 10/2014 | Yano | ............... | F21V 31/03 96/11 |
| 2015/0070927 A1 * | 3/2015 | Kurahashi | ............... | B01D 53/26 362/546 |
| 2016/0273789 A1 * | 9/2016 | Gwen | ............... | F24F 3/1411 |
| 2017/0138621 A1 * | 5/2017 | Wang | ............... | F24F 1/02 |
| 2018/0135876 A1 * | 5/2018 | Gwak | ............... | C02F 1/325 |

FOREIGN PATENT DOCUMENTS

| | | |
|---|---|---|
| JP | 2004-095526 A | 3/2004 |
| JP | 2014-161760 A | 9/2014 |
| JP | 5705377 B2 | 4/2015 |
| KR | 10-1237169 B1 | 2/2013 |
| KR | 10-1453290 B1 | 11/2014 |

* cited by examiner

[A]

[B]

[A]

[B]

[A]

[B]

[A]

[B]

DEHUMIDIFYING APPARATUS

CROSS REFERENCE TO RELATED APPLICATIONS

This application is a U.S. National Stage of International Application No. PCT/KR2016/005394, filed May 20, 2016, which claims priority to KR 10-2015-0070708, filed May 21, 2015 and KR 10-2015-0096256, filed Jul. 7, 2015, the entire contents and disclosures of which are incorporated herein by reference.

TECHNICAL FIELD

The present invention relates to a dehumidifying apparatus.

More specifically, the present invention relates to a general-purpose dehumidifying apparatus that has a housing provided with a dehumidifying member and applied to objects-to-be-dehumidified (outdoor or indoor electronic enclosures such as lights, such as street lamps or vehicle lamps, distribution boards, communication equipment, security equipment, and photovoltaic systems), removes internal moisture through an outer valve, which is configured to open and close the external communication portion of the housing, (closes an outer valve) when the temperature of the object-to-be-dehumidified is low, and discharges moisture to the outside by opening the outer valve together with temperature rise in a lamp module when the temperature of the object-to-be-dehumidified is high.

Additionally, the present invention relates to a general-purpose dehumidifying apparatus having an outer valve, which is provided on the outside of the dehumidifying member of the housing, and an inner valve separately provided inside the dehumidifying member to completely remove moisture from the dehumidifying member by closing the inner valve according to opening of the outer valve when the temperature of the object-to-be-dehumidified rises, wherein the inner and outer valves are formed of bimetal such that the opening/closing operation and the dehumidification operation can be performed without power.

BACKGROUND ART

For various objects-to-be-dehumidified including outdoor or indoor electronic enclosures such as lights, such as street lamps and vehicle lamps, distribution boards, communication equipment, security equipment, and photovoltaic systems, moisture needs to be removed from the enclosures to protect internal circuits or elements.

Specifically, it is ideal to apply a sealing structure for waterproofing to an electronic enclosure such as a control panel or a distribution board, particularly an electronic enclosure installed outdoors. However, as the air inside the enclosure shrinks and expands according to change in temperature inside and outside the electronic enclosure, a vent for pressure balance is commonly introduced in order to prevent breakage of various components, elements, etc. in the electronic enclosure due to internal pressure fluctuation.

When the vent is employed, air can flow through the electronic enclosure, and thus there is a possibility of moisture condensation in the enclosure due to the temperature difference.

For example, a vehicle lamp, which can be classified as an electronic enclosure, has an open structure for ventilation, not an airtight structure, in order to relieve the internal pressure of air that is expanded along with rise of the internal temperature at the time of lighting. Accordingly, condensation often occurs due to differences in temperature and humidity between the inside and outside of the lamp.

If the condensation inside the lamp is repeated and the condensation state is not addressed, problems may arise in the original properties (emission angle, etc.) of the lamp, which may adversely affect safety and deteriorate electric insulation, thereby encountering other problems.

To address this problem, a vehicle head lamp having a moisture removing means is disclosed in Korean Patent Application Publication No. 10-2006-0067597 (published on Jun. 20, 2006).

This patent document discloses a vehicle head lamp having a moisture removing means for removing moisture formed on the inner surface of a head lamp lens cover installed on the front surface of the head lamp when the head lamps inserted into the head lamp housings on both left and right sides of the vehicle operate.

Specifically, the vehicle head lamp includes a moisture removing means installed in a moisture production area where moisture is produced during operation of the head lamp inside a head lamp lens cover installed on a front surface of the head lamp and formed in a round shape to have a height difference at both ends thereof; and an overheat prevention unit capable of cutting off the current when the current flowing during operation of the moisture removing unit is excessive.

However, the moisture removing means, which is provided with a heater of a hot wire, is insufficient to effectively discharge air from the lamp and is less practical in that it raises a safety issue when it is operated at a temperature higher than the temperature at the time of lamp lighting.

Korean Patent Application Publication No. 10-2012-0050268 (published on May 18, 2012) also discloses a dehumidification method of a vehicle head lamp.

According to this patent document, the method includes a diffuse reflection measurement step of measuring diffuse reflection of a light source emitted from a light through a photodiode sensor mounted on a head lamp of a vehicle; a diffuse reflection comparison/determination step of comparing a diffuse reflection result value measured in the diffuse reflection measurement step with an initially set reference value; a power driving step of driving power through a controller operatively connected with an ECU provided in the vehicle when the diffuse reflection result value measured in the diffuse reflection comparison/determination step exceeds the reference value; and a dehumidification step of dehumidifying the inside of the head lamp by operating a fan operatively connected with the controller during power driving in the power driving step.

However, it is considered to be difficult in reality to implement a dehumidification technique by operating only the fan in the vehicle lamp that has a constant ventilation structure.

Next, Korean Patent No. 10-1366848 (registered on Feb. 14, 2014) discloses a moisture removing apparatus for an automotive head lamp.

This patent document discloses a head lamp dehumidifying apparatus installed in a head lamp housing of an automobile to circulate air inside a head lamp to remove moisture. The head lamp dehumidifying apparatus includes a ventilation unit for preventing inflow of water droplets from the outside and discharging moisture and hot gas to the outside, the ventilation unit being installed in a discharge hole to discharge internal air from a lamp housing, a moisture absorption unit for absorbing or adsorbing moisture contained in the air inside the head lamp, and an air blowing unit for forcibly circulating the air in the head lamp.

However, this patent is also less practical as it fails to propose a solution to the problem that the moisture absorption unit catches not only the moisture inside the lamp but also the outside moisture due to the nature of the lamp structure of the vehicle, which has a constant ventilation structure.

Another conventional technology is disclosed in Korean Patent No. 10-0836307 ("DEHUMIDIFICATION STRUCTURE OF HEAD LAMP FOR VEHICLE USING BENTONITE NATURAL CLAY PACK") (registered on Jun. 2, 2008).

This patent relates to a dehumidification structure of a head lamp for a vehicle using a bentonite natural clay pack.

In particular, the bentonite natural clay pack is used as a desiccant to absorb water at a temperature below 50° C., and to evaporate water at 50° C. to 100° C., thereby enabling dehumidification of the head lamp.

More specifically, the dehumidification structure of a head lamp for a vehicle includes a bentonite natural clay pack configured to absorb moisture at a temperature below a predetermined temperature range and evaporate moisture at a predetermined temperature range, the bentonite natural clay pack having a regenerative capacity through repetition of absorption and evaporation, a bentonite natural clay pack accommodating space for accommodating the bentonite natural clay pack, provided in a lower portion of the side surface of a head lamp bezel near a head lamp bulb, and a fixing bracket for fixing the bentonite natural clay pack to the head lamp bezel.

However, this patent only provides a dehumidification member composed of a bentonite natural clay pack and fails to provide a solution to the problem occurring in absorbing moisture contained in the external air circulating inside the same lamp as the above two conventional technologies.

DISCLOSURE

Technical Problem

Therefore, the present invention has been made in view of the above problems, and it is one object of the present invention to provide a general-purpose dehumidifying apparatus that is applicable to various objects-to-be-dehumidified including outdoor or indoor electronic enclosures such as lights, such as street lamps or vehicle lamps, distribution boards, communication equipment, security equipment, and photovoltaic systems, more particularly, a general-purpose dehumidifying apparatus capable of preventing corrosion or damage of internal components or devices of objects-to-be-dehumidified such as electronic enclosures provided with a vent from occurring due to condensation.

More specifically, it is one object of the present invention to provide a general-purpose dehumidifying apparatus having a housing provided with a dehumidifying member and installed in an object-to-be-dehumidified, and an outer valve provided to open and close the external communication portion of the housing to absorb only moisture inside the object-to-be-dehumidified during moisture absorption such that the dehumidification function of the dehumidifying member and repeated use of the dehumidifying member can be ensured.

It is another object of the present invention to provide a dehumidifying apparatus including an inner valve provided separately in the internal communication portion provided on the opposite side of the external communication portion of the housing with the dehumidifying member interposed therebetween, such that the inner valve operates in reverse to the outer valve so as to be opened when the dehumidifying member absorbs moisture and to be closed when the temperature of the object-to-be-dehumidified is high, in order to maximize the efficiency of dehumidification and regeneration of the dehumidifying member.

It is yet another object of the present invention to provide a dehumidifying apparatus that secures dehumidification efficiency and the function of repeated dehumidification through various elements such as an opening/closing body formed of bimetal to open and close the inner and outer valves as it is deformed by increase in temperature, or a separate opening/closing body driving means.

It is yet another object of the present invention to provide a dehumidifying apparatus capable of drying and regenerating a dehumidifying member through a separate heater rather than discharging the moisture absorbed by the dehumidifying member to the outside by temperature rise of the object-to-be-dehumidified.

Technical Solution

In accordance with one aspect of the present invention, provided is a dehumidifying apparatus including:

a housing installed in an object-to-be-dehumidified and having an internal communication portion and an external communication portion, the internal communication portion and the external communication portion being connected to an outside;

a dehumidifying member installed in the housing;

and an outer valve configured to open and close the external communication portion of the housing.

The dehumidifying apparatus further includes:

an inner valve configured to open and close the internal communication portion of the housing.

The outer valve includes an outer opening/closing body displaced by temperature rise of the object-to-be-dehumidified to open the external communication portion, and an outer sealing body arranged between the outer opening/closing body and the external communication portion, the outer opening/closing body closing the external communication portion when the object-to-be-dehumidified is cooled.

When the inner valve configured to open and close the internal communication portion of the housing is included, the inner valve includes an inner opening/closing body displaced by temperature rise of the object-to-be-dehumidified to close the internal communication portion, and an inner sealing body arranged between the inner opening/closing body and the internal communication portion, the inner opening/closing body opening the internal communication portion when the objet-to-be-dehumidified is cooled.

At least one of the outer opening/closing body and the inner opening/closing body is formed of bimetal.

Preferably, a separate heater is further provided.

Advantageous Effects

The dehumidifying apparatus according to the present invention is applicable to various objects-to-be-dehumidified including outdoor or indoor electronic enclosures such as lights, such as street lamps or vehicle lamps, distribution boards, communication equipment, security equipment, and photovoltaic systems. More particularly, the dehumidifying apparatus is capable of preventing corrosion or damage of internal components or devices of objects-to-be-dehumidified such as electronic enclosures provided with a vent from occurring due to condensation. Specifically, a housing provided with a dehumidifying member is installed in an object-to-be-dehumidified, and an outer valve is provided to open and close the external communication portion of the housing to absorb only moisture inside the object-to-be-dehumidified during moisture absorption. Thereby, the dehumidification function of the dehumidifying member and repeated use of the dehumidifying member can be ensured. In addition, an inner valve is provided separately in the internal communication portion provided on the opposite side of the external communication portion of the housing with the dehumidifying member interposed therebetween, such that the inner valve operates in reverse to the outer valve so as to be opened when the dehumidifying member absorbs moisture and to be closed when the temperature of the object-to-be-dehumidified is high. Thereby, the efficiency of dehumidification and regeneration of the dehumidifying member may be maximized. Further, the dehumidifying apparatus can secure dehumidification efficiency and the function of repetitive dehumidification through various elements such as an opening/closing body formed of bimetal to open and close the inner and outer valves as it is deformed by increase in temperature, or a separate opening/closing body driving means. Additionally, the dehumidifying apparatus is capable of drying and regenerating a dehumidifying member through a separate heater rather than discharging the moisture absorbed by the dehumidifying member to the outside by temperature rise of the object-to-be-dehumidified.

Figure 1:
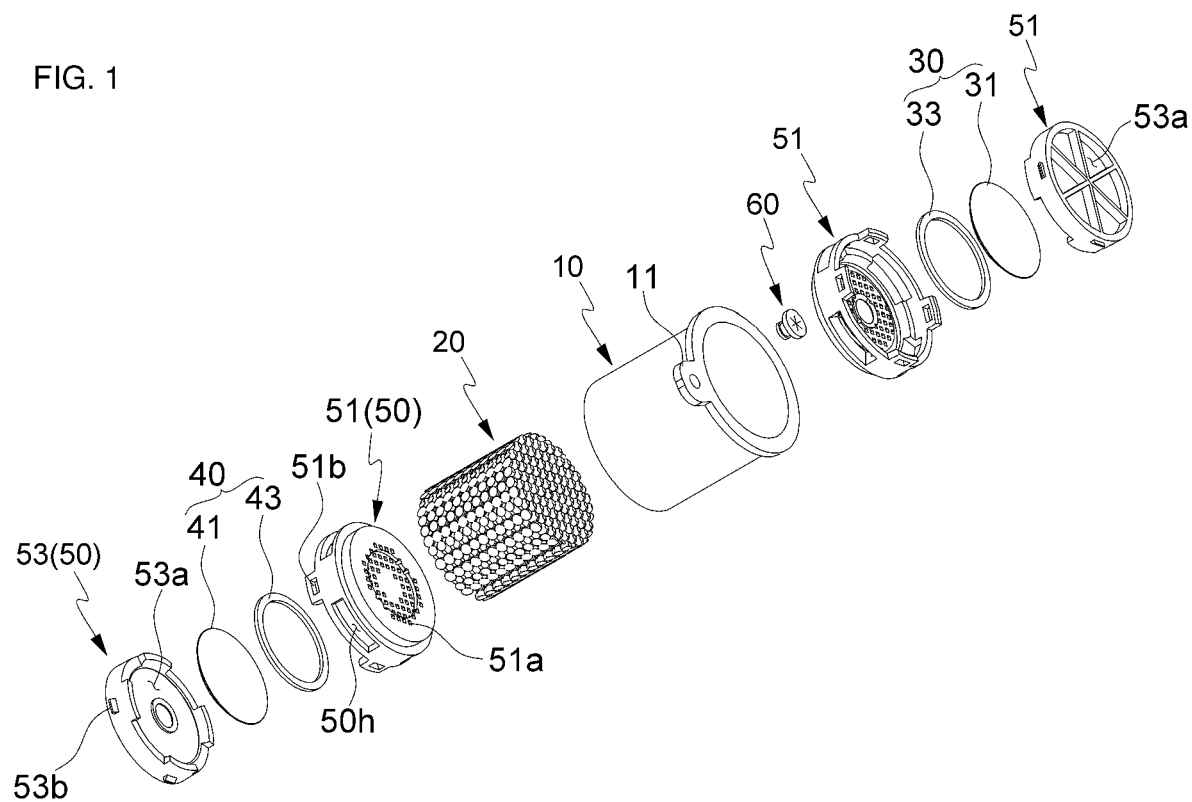
FIG. 1 is an exploded perspective view of a dehumidifying apparatus according to the present invention.

| Reference Numerals of Main parts of Drawings | |
| --- | --- |
| A: Dehumidifying apparatus | 10: Housing |
| 20: Dehumidifying member | 30, 40: Valve |
| 50: Cap | 60: Pressure valve |

BEST MODE

Hereinafter, the present invention will be described in detail with reference to the accompanying drawings.

The present invention can be modified in various ways, and have various embodiments, and thus aspects (or embodiments) are described in detail in the following description. It should be understood, however, that the invention is not intended to be limited to particular forms disclosed, but on the contrary, is intended to cover all modifications, equivalents, and alternatives falling within the spirit and scope of the invention.

In the drawings, the same reference numerals, and in particular, reference numerals having the same tens and ones digits, reference numerals having the same tens digits, reference numerals having the same ones digits and letters represent members having the same function or similar functions. Unless stated otherwise, the members referred to by the reference numerals in the drawings may be identified as members corresponding to these criteria.

In the drawings, the sizes or thicknesses of the components are exaggerated to be increased (or reduced), or simplified in consideration of convenience of understanding of the components, or are simplified to express the components. However, the scope of protection of the present invention should not be construed as being limited thereby.

Terms used in this specification are merely adopted to explain specific implementation examples (aspects) (or embodiments), and are not intended to limit the present invention. As used herein, the singular forms "a", "an", and "the" are intended to include the plural forms as well, unless context clearly indicates otherwise. In this specification, the terms "include", "comprise", and the like are intended to indicate that characteristics, figures, steps, operations, constituents, and components disclosed in the specification or combinations thereof exist. The terms "include", "comprise", and the like should be understood as not precluding possibility of existence or addition of one or more other characteristics, figures, steps, operations, constituents, components, or combinations thereof.

Unless stated otherwise, all terms used herein, including technical or scientific terms, have the same meaning as commonly understood by those of ordinary skill in the art to which the present invention pertains. Terms such as those defined in commonly used dictionaries are to be interpreted as having a meaning consistent with the meaning in the context of the related art and are not to be construed as ideal or overly formal in meaning unless expressly so-defined in the present application.

In this specification, a detailed description of well-known functions and constituents may be omitted if it is determined that such description can unnecessarily obscure the main points of the present invention.

Figure 2:
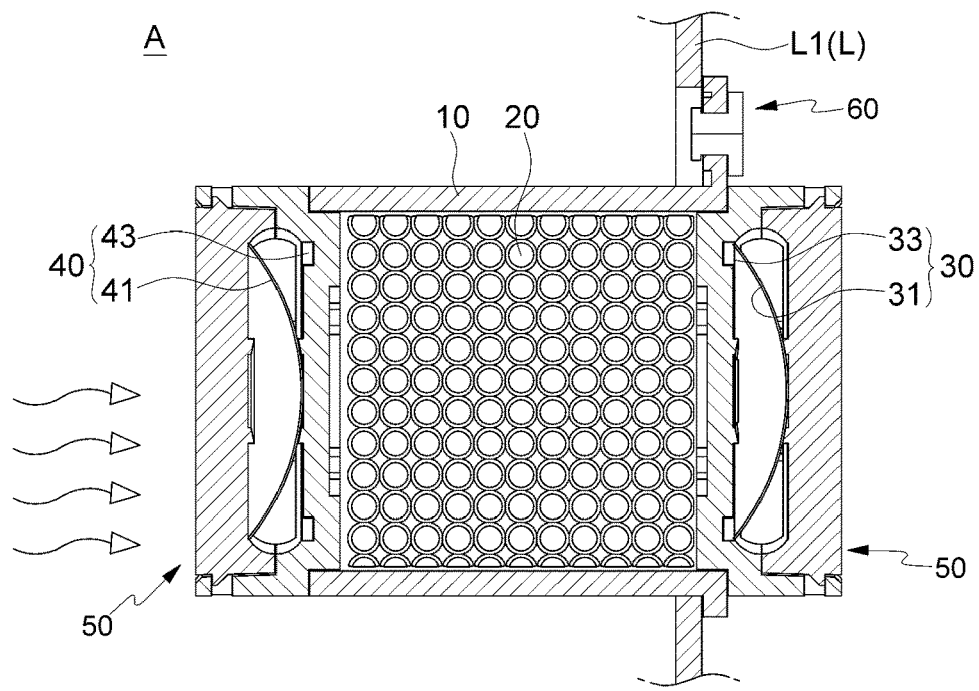
FIG. 2 illustrates operation of the dehumidifying apparatus according to the present invention.
Figure 2:
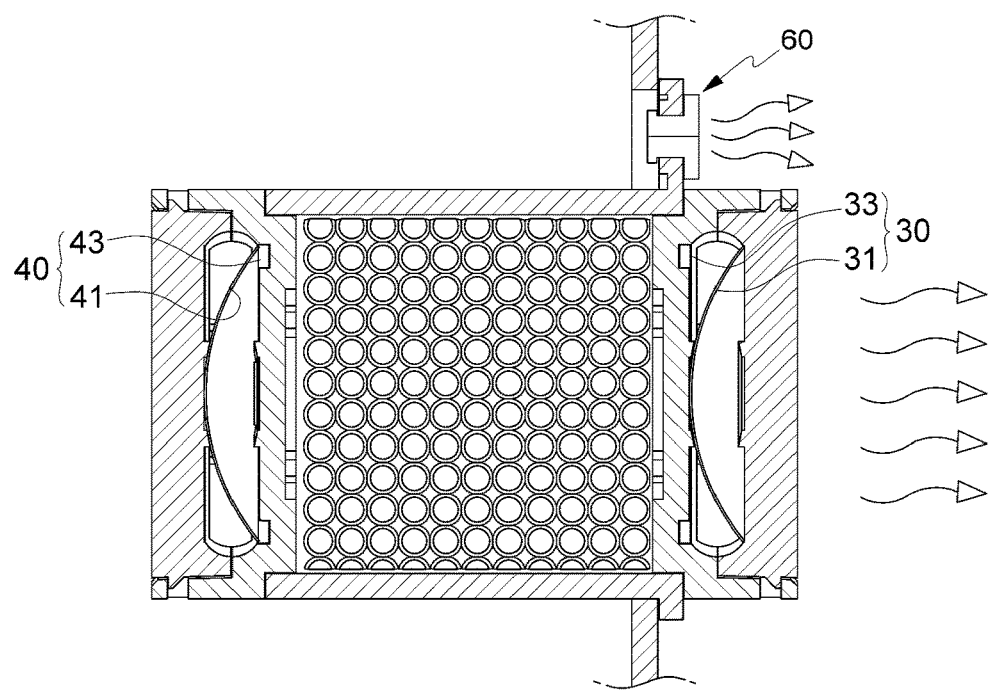
Figure 3:
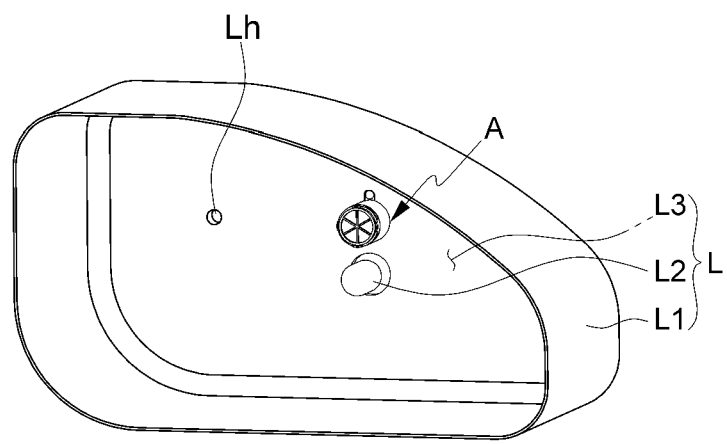
FIG. 3 is a schematic view illustrating installation of the dehumidifying apparatus according to the present invention in a vehicle lamp.
Figure 3:
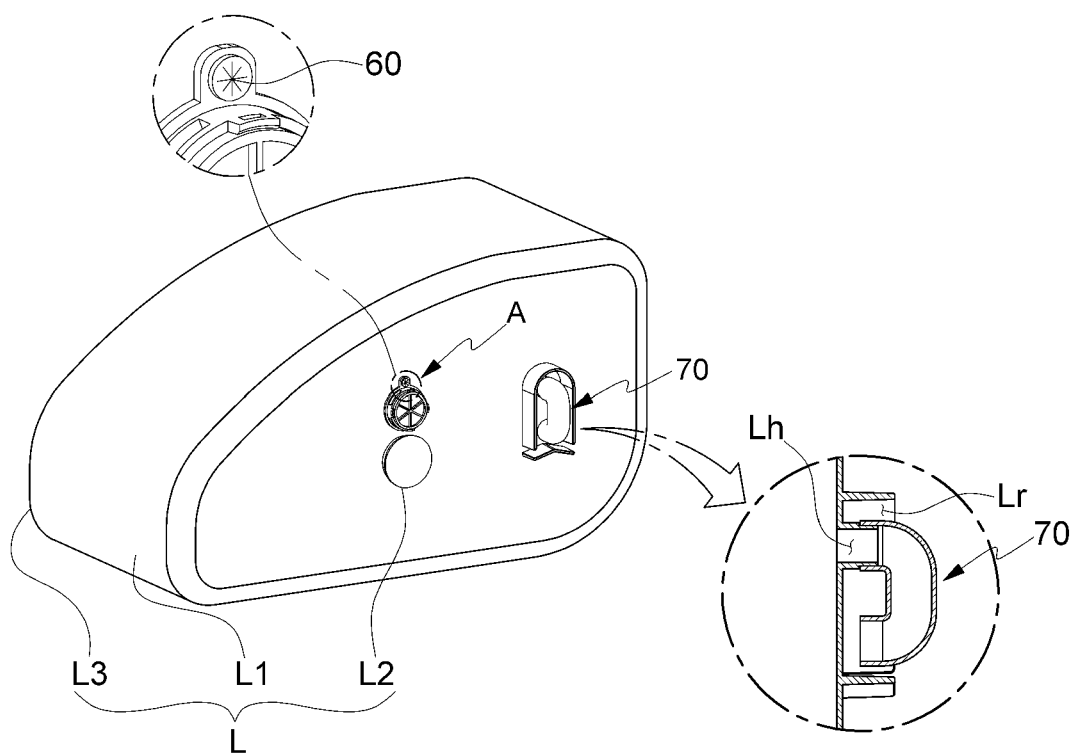
Figure 4:
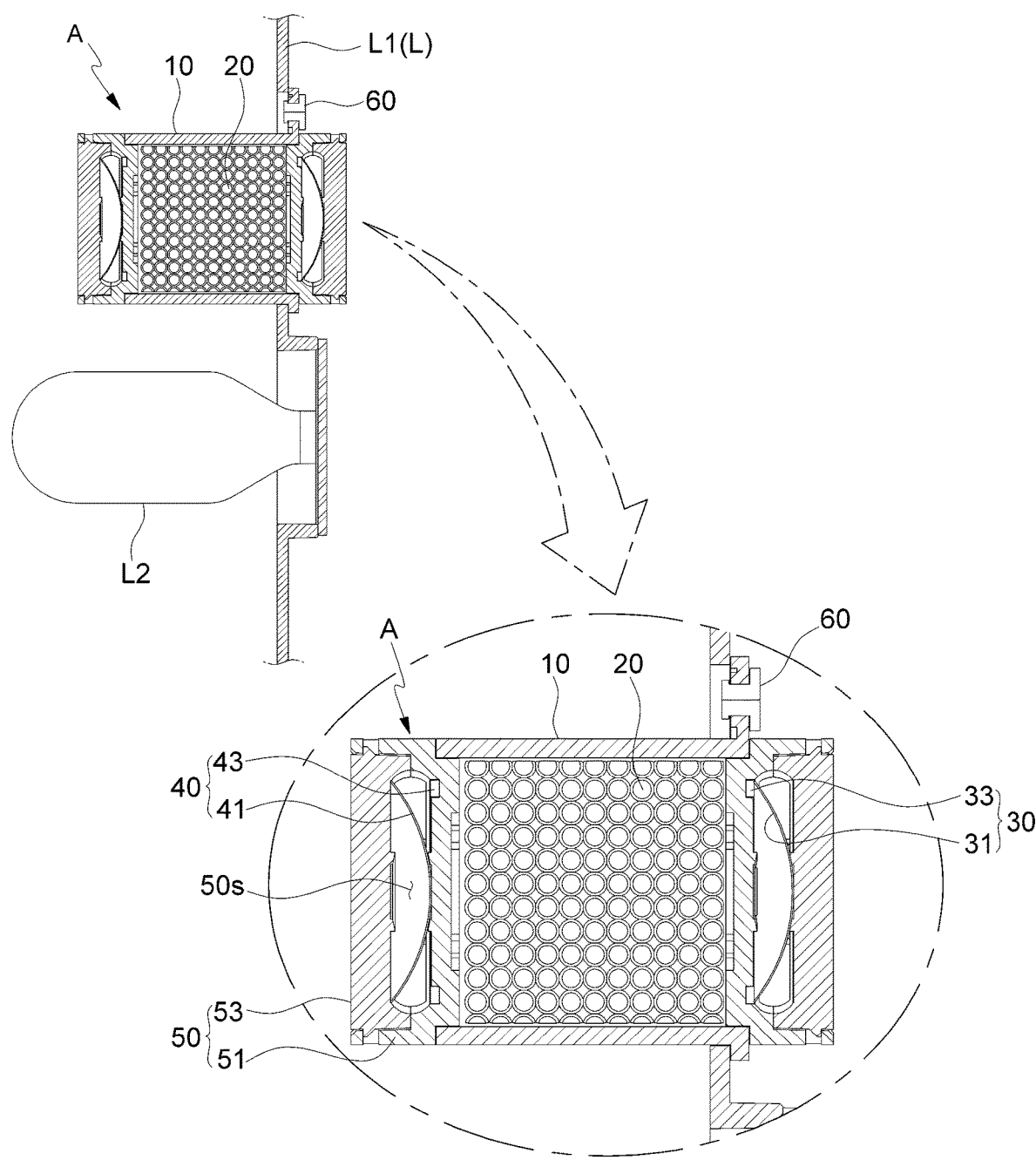
FIG. 4 is a schematic cross-sectional view of an installation position of the dehumidifying apparatus according to the present invention.

As shown in FIGS. 2 to 3, a dehumidifying apparatus A according to the present invention is applied to various objects-to-be-dehumidified including outdoor or indoor electronic enclosures such as lights, such as street lamps or vehicle lamps, electronic control distribution boards, communication equipment, security equipment, and photovoltaic systems. FIGS. 3 and 4 illustrate specific examples of applications in which the dehumidifying apparatus is mounted on a vehicle lamp, particularly a head lamp, to perform the dehumidification function. However, the range of objects-to-be-dehumidified, to which the dehumidifying apparatus of the present invention is applied, is not limited due to the illustrative embodiments. The specific examples are merely provided to provide further understanding of the concept of the present invention.

FIG. 3 is a schematic perspective view of a vehicle lamp module L. FIG. 3[A] is a schematic front perspective view in which a light-transmitting cover L3 is omitted, and FIG. 3[B] is a rear perspective view of the lamp module.

The vehicle lamp module L includes a base L1, a lamp L2 provided on the base, and a light-transmitting cover L3 coupled to the front surface of the base.

While the dehumidifying apparatus A according to the present invention is illustrated as being arranged on the rear side of the base L1, particularly near the lamp L2 so as not to deteriorate the outer appearance of the vehicle lamp module, it may be installed at various positions in the lamp module when necessary.

As can be seen from FIGS. 3[A] and 3[B] and the cross-sectional view inside the circle of a dashed dotted line on the right side of FIG. 3[B], the vehicle lamp module L has a ventilation structure to relieve pressure of internal air that expands along with increase in internal temperature when the lamp is turned on.

That is, when necessary, a U-shaped ventilation tube (one set of vents) that is connected to a ventilation hole Lh formed in the lamp module base L1 and is bent downward to prevent infiltration of external water may be provided.

In order to allow only internal air and external air to pass through the ventilation tube and further prevent infiltration of water or moisture, the base L1 of the lamp module is surrounded by a flange to form a recess Lr around the ventilation tube 70.

The dehumidifying apparatus A of the present invention installed in the vehicle lamp module L, particularly on the base L1, includes a housing 10, a dehumidifying member 20 provided in the housing 10, and an outer valve 30. The dehumidifying apparatus A further includes an inner valve 40.

In the present specification and the accompanying claims, terms "inside", "outside", "inner", "outer" and the like refer to the dehumidification space of an object-to-be-dehumidified surrounded by a case or a housing (specifically, the terms are used to indicate whether or not the corresponding element is in the space between the light-transmitting cover L3 and the base L1 of the vehicle lamp module L).

To dehumidify the space between the light-transmitting cover L3 and the base L1 of the vehicle lamp module L, the housing 10 of the dehumidifying apparatus A is provided with an internal communication portion connected to the vehicle lamp module, namely, the space, and an external communication portion connected to the outside (in particular, the rear outer side of the base L1).

As can be seen from FIGS. 3 and 4, in the dehumidifying apparatus A according to the present invention, a relatively large portion of the housing 10 is arranged in an object-to-be-dehumidified, specifically an electronic enclosure, more specifically, the lamp module L, and only the external communication portion, particularly an outer cap 50, is exposed to the outside.

However, the housing may have various arrangements in consideration of appearance and dehumidifying function of the vehicle lamp module.

The dehumidifying member 20 may employ silica gel or various other known dehumidifying agents, and may be selected in consideration of productivity, ease of assembly, price competitiveness, etc. The dehumidifying member may be installed in a breathable cover or the like to have a shape such as a cylinder.

Next, the outer valve opens and closes the external communication portion of the housing 10 with the built-in dehumidifying member 20 placed therein.

When the lamp is turned off, the outer valve closes the external communication portion of the housing to allow the dehumidifying member 20 to absorb moisture in the lamp module.

When the temperature of the object-to-be-dehumidified rises (when the temperature of the object-to-be-dehumidified rises due to a temperature-raising factor in the object-to-be-dehumidified, a heater operates in the case where the object-to-be-dehumidified or the housing is further provided with the heater, or the vehicle lamp is turned on), the outer valve is preferably opened such that the absorbed moisture is dissipated, removed and generated through the external communication portion according to temperature rise in the open lamp.

In addition, when an inner valve for opening and closing the internal communication portion is provided, it is operatively connected with the outer valve.

When the object-to-be-dehumidified is cooled (when the temperature is lowered by a temperature-lowering factor in the object-to-be-dehumidified, the heater does not operate in the case where the object-to-be-dehumidified or the housing is further provided with the heater, or the vehicle lamp is turned off), the inner valve opens the internal communication portion of the housing to allow the dehumidification member to remove moisture from the lamp module.

When the temperature of the object-to-be-dehumidified increases (when the lamp is turned on), the inner valve is closed to prevent the moisture vaporized from the dehumidifying member from flowing back into the object-to-be-dehumidified (e.g., the lamp module).

In addition, the normally open vent such as the ventilation hole Lh of the lamp module base L1 or the ventilation tube 70 may be omitted.

As can be seen from FIGS. 1 and 4, a pressure valve 60 may be separately introduced and configured to be opened by pressure due to expansion of air or through pressure sensing or temperature sensing in order to relieve the pressure due to expansion of air along with increase in internal temperature when the vehicle lamp is turned on. The pressure valve may also be introduced into objects-to-be-dehumidified, such as various electronic enclosures.

The pressure valve 60 may be made of rubber or other synthetic resin materials and be provided with a radial cutout portion that is deformed by the expanding air to be opened and is returned to the original position to be closed (and to prevent inflow of external air and introduction of foreign substances such as moisture) when the pressure is relieved, as seen in the enlarged view of a dashed dotted line on the upper side of FIG. 3[B].

If necessary, the pressure valve may be introduced into the ventilation hole Lh or the ventilation tube 70 to improve the ventilation structure so as not to be opened at all times.

As described above, the dehumidifying apparatus A according to the present invention is basically applied to an object-to-be-dehumidified (e.g., an electronic enclosure such as a vehicle lamp) of a semi-enclosed structure (a structure that is opened only when pressure increases in the lamp) into which a pressure valve is introduced. When necessary, various modified models may be applied to the object-to-be-dehumidified of a constant external air communication structure.

As can be seen from FIGS. 1, 2, and 4, the outer opening/closing body 31 of the outer valve 30 or the inner opening/closing body 41 of the inner valve 40, or both may be formed of bimetal, and thus may be deformed by temperature change when the temperature of the object-to-be-dehumidified increases (e.g., when the lamp is turned on), such that moisture absorption and moisture discharge function of the dehumidifying member 20 can be smoothly realized.

The bimetal utilizes the property of bending according to temperature.

The bimetal is formed by bonding a metal plate, such as an alloy plate of nickel (Ni) and iron (Fe), which hardly expands, and a metal plate of an alloy of nickel (Ni), manganese (Mn) and iron (Fe), an alloy of nickel (Ni), molybdenum (Mo) and iron (Fe), or an alloy of nickel (Ni), manganese (Mn) and copper (Cu), which expands easily.

In FIGS. 1, 2, and 4, the inner and outer opening/closing bodies 41 and 31 employ bimetal having a dome-type structure.

The dehumidifying apparatus A according to the present invention has a flange 11 at the outer end of the housing 10 for ensuring ease of assembly and has a mounting projection 13 at one side of the flange for introducing the pressure valve 60.

When the assembled dehumidifying apparatus A is inserted into the installation hole of the object-to-be-dehumidified, namely, the base L1 of the vehicle lamp module L, the flange 11 of the housing is engaged with the base.

Then, a screw, an adhesive or the like may be used to fix the dehumidifying apparatus. Alternatively, various other means such as a hook coupling structure, a bolt coupling structure (forming a male screw on the outer circumferential surface of the housing inside the flange 11 and coupling the male screw with a large-diameter nut on the inside of the lamp module L to fix the periphery of the installation hole of the base between the nut and the flange) may be used.

The dehumidifying apparatus A according to the present invention includes a cap 50 on both sides of the internal and external communication portions of the housing to ensure ease of assembly of the outer opening/closing body 31 of the outer valve 30 or the inner opening/closing body 41 of the inner valve 40 that is formed as a bimetal dome type valve.

The cap 50 includes an inner body 51 and an outer body 53 for fixing the dehumidifying member 20 provided in the housing.

The inner and outer bodies 51 and 53 have ventilation holes 51a and 53a to provide a communication structure that allows the dehumidifying member 20 to absorb the moisture inside the lamp and discharges the absorbed moisture to the outside so as to regenerate the dehumidifying member 20.

A deformation space 50s for the inner and outer opening/closing bodies 41 and 31 formed of bimetal is provided between the inner and outer bodies 51 and 53 of the cap 50.

The inner and outer bodies 51 and 53 are coupled to each other through a fastening portion 51b (in the form of a fastening hole) and a corresponding fastening portions 53b (in the form of a hook).

The inner body 51 and the housing 10 may be coupled by a screw or the like, or may be coupled through various other coupling structures.

Further, when the inner and outer opening/closing bodies 41 and 31 of the inner and outer valves 40 and 30 change according to change in temperature of the object-to-be-dehumidified (i.e., turning on/off of the lamp), the internal and external communication portions are closed.

FIG. 2 illustrates operation of the dehumidifying apparatus.

That is, FIG. 2[A] illustrates that, when the object-to-be-dehumidified is cooled, namely, when the lamp L2 is turned off, only the opening/closing body 31 of the outer valve 30 closes the external communication portion.

FIG. 2[B] illustrates that, when the temperature of the object-to-be-dehumidified increases, namely, when the lamp L2 is turned on, only the opening/closing body 41 of the inner valve 40 closes the internal communication portion.

The following can be seen from the figures.

In order to secure complete closing of the communication portion, a sealing body 43, 33 is preferably provided between the inner or outer opening/closing body 41, for opening and closing the internal or external communication portion and the internal or external communication portion, in particular, on the inner body 51 of the cap 50. These inner and outer sealing bodies 43 and 33 may be typical packing rings having cushioning properties.

Figure 5:
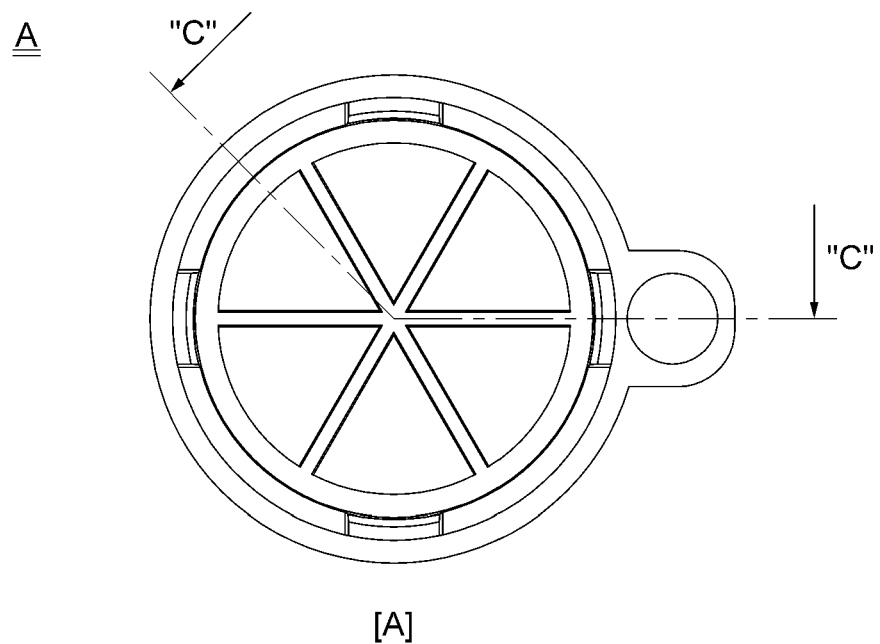
FIG. 5 is a view related to a moisture transfer path of the dehumidifying apparatus according to the present invention.
Figure 5:
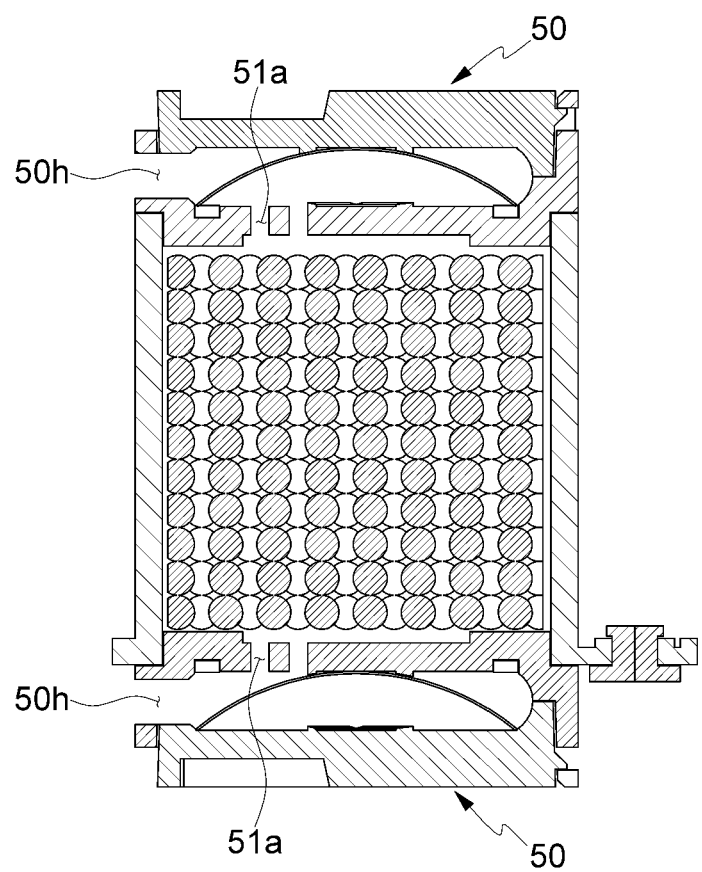

The inner body 51 of the cap 50 is provided with a ventilation slit 50h (see FIGS. 1 and 5) (FIG. 5[A] is a side view and FIG. 5[B] is a cross-sectional view taken along line "C-C" of FIG. 5[A]). Thus, when the object-to-be-dehumidified is cooled (i.e., the lamp is turned off), air containing moisture in the object-to-be-dehumidified (i.e., the lamp module) flows into the dehumidifying member 20 through the ventilation hole 51a of the inner body 51. The moisture collected by the dehumidifying member is discharged to the outside when the temperature of the object-to-be-dehumidified increases (the lamp is turned on or the heater is operated).

Figure 6:
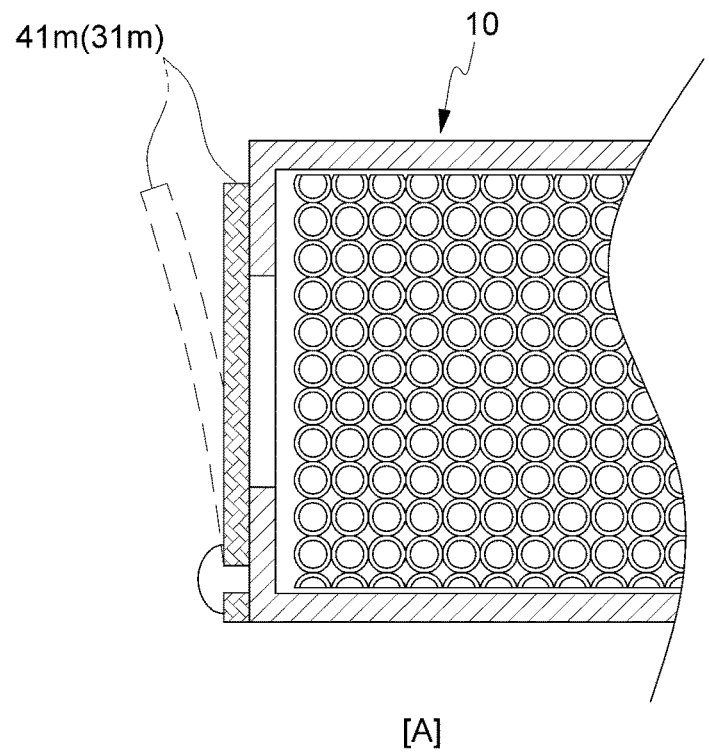
FIG. 6 is a schematic view of a modification of the dehumidifying apparatus according to the present invention.
Figure 6:
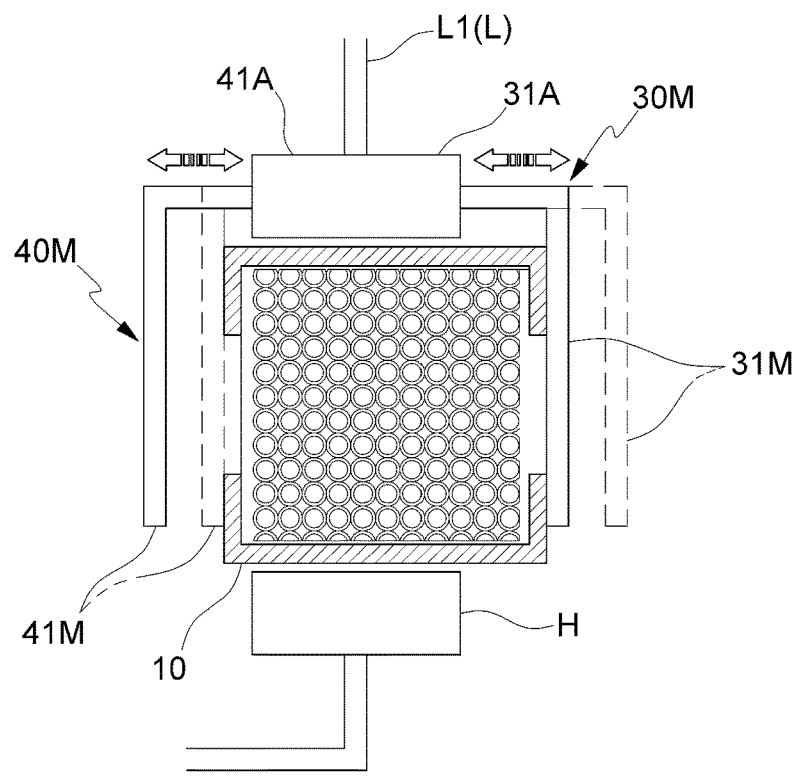

FIG. 6 shows a dehumidifying apparatus A according to another embodiment of the present invention. FIG. 6[A] shows inner and outer opening/closing bodies 41m and 31m having a flat plate shape in place of the inner and outer opening/closing bodies 41 and 31 formed of dome-type bimetal.

The inner opening/closing body 41m is fixedly mounted on the lower portion of the housing to open the internal communication portion (indicated by a dotted line) during cooling of the object-to-be-dehumidified (when the lamp is turned off), and to close the internal communication portion when the temperature of the object-to-be-dehumidified increases (when the lamp is turned on).

On the other hand, in the example of FIG. 6[B], inner and outer opening/closing bodies 41M and 31M of the inner and outer valves 40M and 30M using a separate electric valve displacement means (e.g., a motor) are provided. Specifically, the valve displacement means may be an actuator 41A, 31A.

In FIG. 6[B], the actuator for the inner and outer opening/closing bodies 41M, 31M preferably includes one motor used for two opening/closing bodies in common and a rectilinear motion connection shaft.

The inner opening/closing body 41M opens the internal communication portion (indicated by a solid line) during cooling of the object-to-be-dehumidified (when the lamp is turned off), and closes the internal communication portion (indicated by a dotted line) when the object-to-be-dehumidified is heated (when the lamp is turned on).

The outer opening/closing body 31M closes the external communication portion (indicated by a solid line) during cooling of the object-to-be-dehumidified (when the lamp is turned off), and opens the external communication portion (indicated by a dotted line) when the object-to-be-dehumidified is heated (when the lamp is turned on).

In addition, as shown in FIG. 6[B], the present invention may be configured to dry and regenerate the dehumidifying member through a heater H separately provided in an object-to-be-dehumidified or the housing rather than discharging moisture absorbed by the dehumidifying member when the object-to-be-dehumidified is heated, for example, when the lamp is turned on.

This heater may be arranged in the object-to-be-dehumidified, i.e., arranged on the base L1 of the lamp module L while being separated from the dehumidifying apparatus A, or may be arranged in contact with the housing 10 of the dehumidifying apparatus. Alternatively, various flexible heaters or heating wires may be used to provide a heater on the outer circumferential surface of the housing of the dehumidifying apparatus or in the housing.

If necessary, the heater may be operated at constant time intervals, or may be operated upon satisfaction of a specified input condition (such as humidity or temperature sensing). Preferably, the heater is operated for a sufficient time to dry the dehumidifying member.

In the above description, well-known techniques related to the specifications and type of the dehumidifying member, the specific size of the dehumidifying apparatus (for example, the dehumidifying apparatus may be designed to have an outer diameter 12 to 20 pi (φ) and a length of about mm for mass production) and the specification of the vehicle lamp, and the like are omitted, but a person skilled in the art can easily guess, deduce, and reproduce the same.

While a dehumidifying apparatus having a specific shape and structure according to the present invention has been mainly described with reference to the drawings, it is intended that the present invention covers the modifications, variations and substitutions of this invention provided they come within the scope of the appended claims and their equivalents.

The invention claimed is:

1. A dehumidifying apparatus comprising:
a housing installed in an object to be dehumidified and having an internal communication portion and an external communication portion, the internal communication portion and the external communication portion being connected to an outside of the housing;
a dehumidifying member installed in the housing;
an outer valve configured to open and close the external communication portion of the housing, and
an inner valve configured to open and close the internal communication portion of the housing,
wherein the outer valve comprises:
an outer opening/closing body displaced by temperature rise of the object to be dehumidified to open the external communication portion; and
an outer sealing body arranged between the outer opening/closing body and the external communication portion, the outer opening/closing body closing the external communication portion when the object to be dehumidified is cooled in an open state of the external communication portion,
wherein the inner valve comprises:
an inner opening/closing body displaced by temperature rise of the object to be dehumidified to close the internal communication portion; and
an inner sealing body arranged between the inner opening/closing body and the internal communication portion, the inner opening/closing body opening the internal communication portion when the objet-to-be-dehumidified is cooled in an closed state of the internal communication portion,
wherein at least one of the outer opening/closing body and the inner opening/closing body is formed of bimetal, and
wherein the object to be dehumidified or the housing further comprises a heater.

\* \* \* \* \*